р

US008809797B2

(12) United States Patent
Yamane et al.

(10) Patent No.: US 8,809,797 B2
(45) Date of Patent: Aug. 19, 2014

(54) SCINTILLATOR FOR NEUTRONS AND NEUTRON DETECTOR

(75) Inventors: Hisanori Yamane, Sendai (JP); Tetsuya Kawano, Sendai (JP); Akira Yoshikawa, Sendai (JP); Takayuki Yanagida, Sendai (JP); Yui Yokota, Sendai (JP); Yutaka Fujimoto, Sendai (JP); Kentaro Fukuda, Shunan (JP); Noriaki Kawaguchi, Shunan (JP)

(73) Assignees: Tokuyama Corporation, Yamaguchi (JP); Tohoku University, Miyagi (JP)

( * ) Notice: Subject to any disclaimer, the term of this patent is extended or adjusted under 35 U.S.C. 154(b) by 0 days.

(21) Appl. No.: 13/885,026

(22) PCT Filed: Dec. 15, 2011

(86) PCT No.: PCT/JP2011/079012
§ 371 (c)(1),
(2), (4) Date: May 13, 2013

(87) PCT Pub. No.: WO2012/081658
PCT Pub. Date: Jun. 21, 2012

(65) Prior Publication Data
US 2013/0264482 A1   Oct. 10, 2013

(30) Foreign Application Priority Data
Dec. 16, 2010   (JP) ................................. 2010-281067

(51) Int. Cl.
*G01T 3/06* (2006.01)
*C04B 35/01* (2006.01)
*G21K 4/00* (2006.01)
*C09K 11/63* (2006.01)
*C09K 11/57* (2006.01)

(52) U.S. Cl.
CPC ......... *C09K 11/57* (2013.01); *C04B 2235/3206* (2013.01); *C04B 2235/3409* (2013.01); *C04B 2235/3203* (2013.01); *C04B 2235/3262* (2013.01); *C04B 2235/3272* (2013.01); *C04B 2235/3281* (2013.01); *C04B 2235/77* (2013.01); *C04B 2235/76* (2013.01); *C04B 2235/658* (2013.01); *C04B 2235/3279* (2013.01); *C04B 2235/3284* (2013.01); *C04B 35/01* (2013.01); *C04B 2235/3241* (2013.01); *C04B 2235/3275* (2013.01); *G21K 4/00* (2013.01); *C09K 11/63* (2013.01); *G01T 3/06* (2013.01)
USPC ....................................................... 250/390.11

(58) Field of Classification Search
CPC .................................. G01T 3/00; G01T 3/06
USPC .................... 250/361 R, 362, 390.01, 390.11
See application file for complete search history.

(56) References Cited

U.S. PATENT DOCUMENTS 4,849,639 A   7/1989   Born et al.
(Continued)

FOREIGN PATENT DOCUMENTS

JP   62-501169   5/1987
(Continued)

OTHER PUBLICATIONS

International Search Report issued Mar. 19, 2012 in International (PCT) Application No. PCT/JP2011/079012.
International Preliminary Report on Patentability issued Jun. 18, 2013 and English translation of Written Opinion of the International Searching Authority issued Mar. 19, 2012 in International Application No. PCT/JP2011/079012.
(Continued)

*Primary Examiner* — Mark R Gaworecki
(74) *Attorney, Agent, or Firm* — Wenderoth, Lind & Ponack, L.L.P.

(57) ABSTRACT

Provided is a scintillator for neutrons that allows the detection of neutrons with superb sensitivity and that is little affected by background noise derived from γ-rays, and a neutron detector that uses the neutron scintillator.
The scintillator for neutrons comprises borate that contains at least Mg and a divalent transition element.

12 Claims, 1 Drawing Sheet

(56) References Cited

U.S. PATENT DOCUMENTS

| 2003/0062486 A1 | 4/2003 | Shimizu et al. |
| 2003/0160178 A1 | 8/2003 | Katagiri |
| 2006/0181196 A1* | 8/2006 | Peuchert et al. .............. 313/501 |

FOREIGN PATENT DOCUMENTS

| JP | 2003-183637 | 7/2003 |
| JP | 2003-248061 | 9/2003 |
| JP | 2005-75916 | 3/2005 |
| WO | 2005/021677 | 3/2005 |

OTHER PUBLICATIONS

Kawano et al., "Preparation, crystal structure and photoluminescence of $Mn^{2+}$-doped magnesium pyroborates solid solutions, $(Mg_{1-x}Mn_x)_2B_2O_5$", Journal of Luminescence, vol. 130, 2010, pp. 2161-2165.

Laureiro et al., "Solid substitutional solutions $Zn_xMg_{1-x}B_4O_7$ ($0 \leq x \leq 1$)", European Journal of Solid State and Inorganic Chemistry, vol. 28, 1991, pp. 749-754.

Kouzes et al., "Neutron detection alternatives to $^3$He for national security applications", Nuclear Instruments and Methods in Physics Research A, vol. 623, 2010, pp. 1035-1045.

* cited by examiner

SCINTILLATOR FOR NEUTRONS AND NEUTRON DETECTOR

TECHNICAL FIELD

The present invention relates to a scintillator for neutrons that comprises a borate, and to a neutron detector including the scintillator for neutrons, and a photodetector. More particularly, the present invention relates to a scintillator for neutrons characterized by comprising a borate that comprises at least Mg and a divalent transition element.

BACKGROUND ART

Neutron detectors are an instance of element technology that supports various kinds of neutron-based technology. Neutron detectors of ever higher performance are required in order to cope with developments in a variety of neutron-based technology, for instance in the field of security, for instance in cargo inspection, in the field of industrial non-destructive testing, or in the field of academic research, for instance structural analysis by neutron diffraction.

The main performance items required from neutron detectors are neutron detection efficiency, and discrimination between neutrons and γ-rays (hereafter also referred to as n/γ discrimination). Detection efficiency refers herein to the ratio of the amount of neutrons that are detected by a detector with respect to the amount of neutrons that are emitted by a neutron source and that strike the detector. Further, n/γ discrimination denotes the ratio of a neutron detection signal with respect to background noise derived from γ-rays. Herein, γ-rays are generated when neutrons strike an element such as Fe (iron), Pb (lead), Cd (cadmium), C (carbon), N (nitrogen) or the like contained in an object to be inspected or in a constituent member for neutron detection. If n/γ discrimination is low, a signal that fails to reflect the interactions between neutrons and the object to be inspected is mixed thereby increasing so-called background noise accordingly.

Neutrons have a high ability of passing through a substance without interacting with the latter, and hence neutron rays are ordinarily detected by relying on neutron capture reactions in which neutrons are quickly converted to energetic charged particles. Conventionally known $^3$He detectors, for instance, rely on a neutron capture reaction by the $^3$He isotope, in which neutrons are detected through conversion to protons and tritons, which are energetic charged particles. Such a detector exhibits high detection efficiency, and is excellent in n/γ discrimination, but $^3$He is an extremely expensive substance, and resources are becoming depleted in recent years, all of which is problematic (see Non-Patent Document 1).

Detectors that utilize a scintillator for neutrons have been developed recently as alternatives for the abovementioned $^3$He detectors. A scintillator for neutrons denotes herein a substance that emits light when struck by neutrons. The various performance items of a neutron detector that utilizes such a scintillator depend on the substance that makes up the scintillator. For instance, the detection efficiency of the scintillator towards neutrons depends on the content of isotope that is susceptible to a neutron capture reaction. Further, the n/γ discrimination depends on the density and the effective atomic number of the scintillator. The probability of interactions with γ-rays decreases, and background noise derived from γ-rays can be reduced, if the density and the effective atomic number of the scintillator are small.

To date, $^6$Li-containing glass and plastic fibers covered with $^6$Li and ZnS(Ag) have been developed as scintillators for neutrons, but the foregoing have still room for improvement as regards neutron detection efficiency and n/γ discrimination (see Non-Patent Document 1).

PRIOR ART DOCUMENT

Non-Patent Document

Non-Patent Document 1: Richard T. Kouzes, et al., "Neutron detection alternatives to $^3$He for national security applications", Nuclear Instruments and Methods in Physics Research A 623(2010) 1035-1045.

DISCLOSURE OF THE INVENTION

Problems to Be Solved by the Invention

It is an object of the present invention to provide a scintillator for neutrons and a neutron detector that allow detecting neutrons with good sensitivity and that are little affected by background noise derived from γ-rays.

Means for Solving the Problems

The inventors focused on the $^{10}$B isotope, which exhibits excellent efficiency in neutron capture reactions, with a view to detecting neutrons with good sensitivity, and conducted various studies on the use of scintillator for neutrons in the form of a borate containing the abovementioned $^{10}$B isotope. As a result, the inventors found that incorporating a divalent transition element into a borate that comprises Mg allows obtaining a scintillator that is little affected by background noise derived from γ-rays and that affords high-luminance emission, and perfected thus the present invention.

Specifically, the present invention provides a scintillator for neutrons characterized by comprising a borate that comprises at least Mg and a divalent transition element.

The present invention provides also a neutron detector that comprises the abovementioned scintillator for neutrons and a photodetector.

Effect of the Invention

According to the present invention, a scintillator for neutrons can be provided that allows detecting neutrons with good sensitivity, and that is little affected by background noise derived from γ-rays. The neutron detector that utilizes such a scintillator for neutrons can be suitably used, for instance, in the field of security, for instance in cargo inspection, in the field of industrial non-destructive testing, or in the field of academic research, for instance structural analysis by neutron diffraction.

BEST MODE FOR CARRYING OUT THE INVENTION

Figure 1:
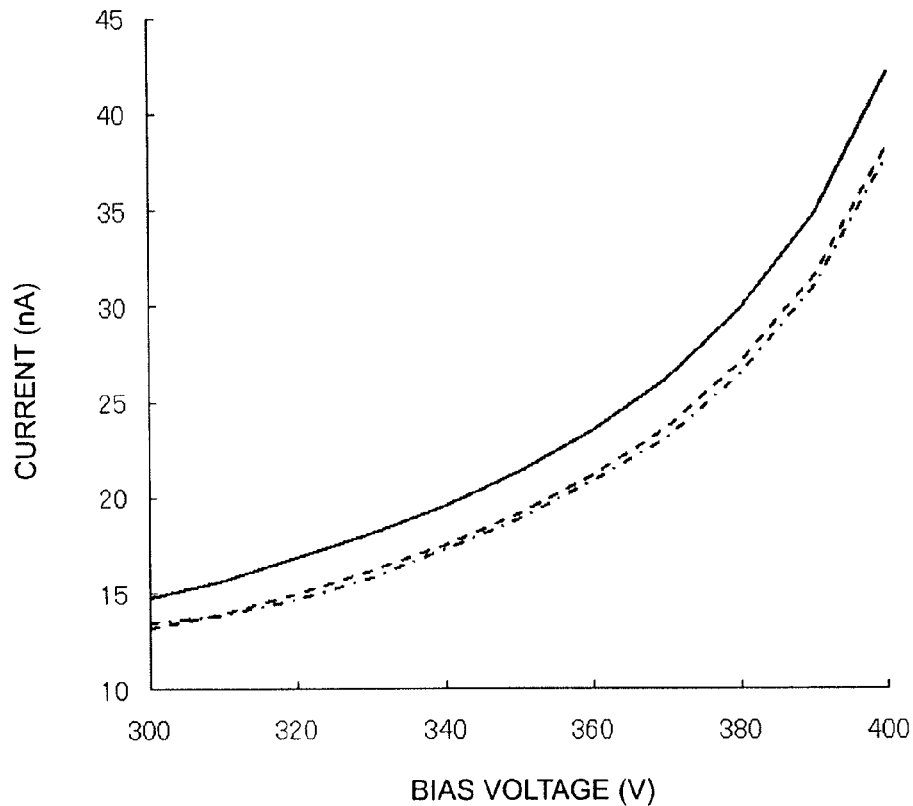
FIG. 1 is a diagram illustrating voltage-current characteristics measured using a neutron detector of Example 1.

The scintillator for neutrons of the present invention comprises a borate that comprises at least Mg and a divalent transition element. The scintillator for neutrons functions as a neutron scintillator through emission of scintillation light, based on the below-described process, when the scintillator is struck by a neutron. When a neutron strikes the scintillator, firstly a neutron capture reaction occurs between the neutron and the $^{10}$B isotope in the scintillator, and α particles and $^7$Li are generated as secondary particles. Next, the scintillator is excited by the secondary particles, and emits scintillation light upon returning to the ground state by way of the divalent transition element.

That is, the $^{10}$B isotope is an essential component for detecting neutrons by exploiting a neutron capture reaction. In the present invention, a borate is used as a stable compound of the $^{10}$B isotope. Boron compounds other than borates exhibit poor chemical stability and biological safety, and are thus problematic in practice.

The natural abundance of the $^{10}$B isotope is high, of about 20%, and hence an ordinarily available borate comprising natural boron can be used in the present invention. Preferably, however, there is used a borate in which the $^{10}$B isotope ratio of boron is equal to or greater than the natural abundance, in order to further increase detection sensitivity towards neutrons. Preferably, the $^{10}$B isotope ratio of boron is set to 50% or higher, and particularly preferably, to 90% or higher.

The scintillator for neutrons of the present invention comprises a borate, among the abovementioned borates, that comprises Mg and a divalent transition element. In the borate that comprises Mg and a divalent transition element, the borate comprising Mg is a borate host material, and the divalent transition element, which is an additive that is added to the borate host material, functions as an emission-center element that emits scintillation light.

In the borate host material, which is chemically stable, Mg provides substitution sites for the divalent transition element, such that the latter can be taken up easily in the borate. Further, Mg has a small atomic number, and hence it becomes possible to reduce the influence from background noise derived from γ-rays.

Among borate host materials, a borate host material represented by chemical formula $Mg_mB_nO_{m+3n/2}$ (where m and n represent positive integers) can be suitably used in the present invention. In the above chemical formula, the upper limits of m and n are not particularly restricted, but are ordinarily 10 or less. Among the above borate host materials $MgB_4O_7$, $Mg_2B_2O_5$ and $Mg_3B_2O_6$ allow increasing the $^{10}$B isotope content, and are thus particularly preferred.

In the present invention, as described above, the divalent transition element functions as an emission center element. Specifically, the scintillator is excited by secondary particles that are generated in the neutron capture reaction between neutrons and the $^{10}$B isotope; thereafter, the scintillator emits light upon relaxation to the ground state by way of electronic transitions, in the divalent transition element. If the divalent transition element is absent, therefore, emission luminance is weak, and the scintillator cannot be used as such.

Among divalent transition elements, Cr, Mn, Fe, Co, Ni, Cu and Zn can be suitably used in the present invention, since these have a small atomic number, and hence allow reducing the influence from background noise derived from γ-rays. In a case where the neutron detector of the present invention utilizes a silicon light-receiving element as the photodetector, then Mn is used most preferably from among the divalent transition elements. The signal output of the photodetector can be increased since Mn emits light in a red wavelength region, and the light detection sensitivity of the silicon light-receiving element is high in that wavelength region.

The divalent transition element can be incorporated into the borate through substitution of part of the Mg in the abovementioned borate that comprises Mg. The present invention requires that both Mg and a divalent transition element be present in the borate. If Mg is totally replaced by the divalent transition element, a problem arises in that emission by the divalent transition element is significantly attenuated on account of concentration quenching, and the borate becomes as a result unusable for the present invention. When incorporating the divalent transition element into the borate, the proportion of Mg substituted by the divalent transition element is preferably set to range from 0.001 to 0.5. Emission luminance by the divalent transition element can be sufficiently increased by setting the proportion to be 0.001 or greater, while attenuation of emission by the divalent transition element, on account of concentration quenching, can be avoided by setting the proportion to 0.5 or less.

As can be grasped from the above explanation, a preferred mode of the present invention involves a neutron scintillator in which the borate that comprises at least Mg and a divalent transition element is a borate represented by any one of chemical formulas $(A_xMg_{1-x})B_4O_7$, $(A_xMg_{1-x})_2B_2O_5$ and $(A_xMg_{1-x})_3B_2O_6$ (where A represents at least one divalent transition element selected from among Cr, Mn, Fe, Co, Ni, Cu and Zn, and x represents a numerical value ranging from 0.001 to 0.5).

In the present invention there is preferably used a borate that, in addition to the above requirements, further comprises Li. Similarly to boron, the $^6$Li isotope in Li exhibits high efficiency in neutron capture reactions. Therefore, detection sensitivity towards neutrons is further enhanced through the use of a borate that comprises Li.

The natural abundance of the $^6$Li isotope is about 7%, and natural Li ordinarily available can be used in the present invention. Preferably, however, the $^6$Li isotope ratio in Li is increased to or above the natural abundance, in order to further increase detection sensitivity towards neutrons. Preferably, the $^6$Li isotope ratio of Li is set to 50% or higher, and particularly preferably, to 90% or higher.

A borate host material further comprising Li that can be suitably used in the present invention is that of chemical formula $Li_lMg_mB_nO_{1/2+m+3n/2}$ (where l, m and n denote positive integers). In above chemical formula, the upper limits of l, m and n are not particularly restricted, but are ordinarily 10 or less. Among the above borate host materials, $LiMgBO_3$, $Li_2MgB_2O_5$ and $Li_4MgB_2O_6$ allow increasing the content of the $^{10}$B isotope and the $^6$Li isotope, and are thus particularly preferred.

The type of divalent transition element incorporated in the borate further comprising Li, and the proportion to which Mg is substituted by the divalent transition element, are identical to those described above. Accordingly, a preferred mode of the present invention involves a neutron scintillator in which the borate is represented by any one of chemical formulas $Li(A_xMg_{1-x})BO_3$, $Li_2(A_xMg_{1-x})B_2O_5$ and $Li_4(A_xMg_{1-x})B_2O_6$ (where A represents at least one divalent transition element selected from among Cr, Mn, Fe, Co, Ni, Cu and Zn, and x represents a numerical value ranging from 0.001 to 0.5).

The scintillator for neutrons of the present invention can be used in the form of a crystal or glass, but is produced ordinarily as a crystal and is suitably used in that form. Among crystals, a scintillator for neutrons that comprises a sintered polycrystal can be produced inexpensively, and can therefore be suitably used in the present invention. A scintillator for neutrons that comprises a single crystal allows achieving high emission intensity without dissipation of light at grain boundaries, and can be thus suitably used in the present invention.

The scintillator for neutrons of the present invention can be used as a neutron detector by being combined with a photodetector.

The photodetector that is used in the present invention is not particularly limited, and there can be suitably used a silicon light-receiving element, for instance an avalanche photodiode or the like, or a conventionally known photodetector such as a photomultiplier tube.

From among the above photodetectors, silicon light-receiving elements are preferred in that they are inexpensive to procure, and in that miniaturized light-receiving elements of that kind can be easily disposed in an array-like layout to yield a position-sensitive photodetector. Examples of such silicon light-receiving elements that can be suitably used include, for instance, an avalanche photodiode (S8664 series, by HAMAMATSU PHOTONICS K.K.).

The scintillator for neutrons of the present invention can be bonded to the light-receiving surface of the silicon light-receiving element or the like, using any optical grease such as transparent silicon grease, to yield the neutron detector of the present invention. By connecting the detector to any current measuring device (for instance, a pico-ammeter), it becomes possible to assess changes in current value, and to check changes in current value depending on changes in the amount of received light. In order to enhance thereupon light-receiving sensitivity, a reverse bias voltage may be applied to the silicon light-receiving element, in which case there may be used an instrument (for instance, KEITHLEY 237 High Voltage Source-Measure Unit) that allows measurements to be performed simultaneously with application of voltage or current. The value of reverse bias voltage that is applied is preferably set in accordance with the performance of the silicon light-receiving element and in accordance with the irradiation amount of neutrons to be measured. The neutron detector can be used as a quantitative neutron detector by measuring beforehand the relationship between current value and irradiation amount of thermal neutrons at a set reverse bias voltage.

EXAMPLES

Examples of the present invention are explained in detail below, but the present invention is not limited in any way by these examples. Also, not all combinations of the features explained in the examples are necessarily essential in means for solving the present invention.

Example 1

Production of a Scintillator for Neutrons

In the present example there was produced a sintered polycrystal of $(Mn_{0.05}Mg_{0.95})_2B_2O_5$, as a scintillator for neutrons.

Herein, MnO, MgO and $H_3BO_3$ were used as starting materials. The purity of the starting materials was 99.9%, 99.9% and 99.99%, respectively, and the $^{10}B$ isotope ratio of $H_3BO_3$ was 95%. Powders of the above starting materials were weighed to yield a molar ratio of $MnO:MgO:H_3BO_3=0.05:0.95:1$, and were crushed and mixed in an agate mortar, followed by compression pressing, to produce pellets having a diameter of 8 mm and a thickness of 2.5 mm.

The pellets were placed on a Pt plate and were heated up to 1000° C. at a temperature rise rate of 200° C./hr. This was followed by firing for 24 hours at 1000° C. Firing was performed under an Ar stream. To prevent oxidation from $Mn^{2+}$ to $Mn^{3+}$, α-Fe powder was placed upstream of the Ar stream.

The obtained sintered polycrystal had a density of 2.4 g/cm$^3$, and was found to be made up of $(Mn_{0.05}Mg_{0.95})_2B_2O_5$ crystals belonging to a triclinic system, space group P-1, on the basis of results of measurements by X-ray diffraction.

The sintered polycrystal was cut and polished, and was worked into a 5 mm×5 mm×0.2 mm square plate shape, to yield the scintillator for neutrons of the present invention.

Production of a Neutron Detector and Characteristic Evaluation

A neutron detector was manufactured using the scintillator for neutrons produced above, and the characteristics of the neutron detector were evaluated.

For the neutron detector, an avalanche photodiode (S8664-1010, by HAMAMATSU PHOTONICS K.K.), which is a silicon light-receiving element, was used as the photodetector. The above neutron scintillator of the present invention was bonded to the light-receiving surface of the avalanche photodiode, using transparent silicon grease, to yield a neutron detector of the present invention.

The neutron detector was connected to a current measuring device (KEITHLEY 237 High Voltage Source-Measure Unit), and current values were measured while under application of 300 to 400 V reverse bias voltage, to evaluate a voltage-current characteristic.

The neutron detector was placed on a JRR-3 MUSASI port, and the voltage-current characteristic was evaluated while thermal neutrons emitted out of the port were irradiated onto the neutron detector. The amount of neutrons emitted out of the port is about $8\times10^5$ neutron/cm$^2$.

The obtained results are illustrated in FIG. 1. The solid line and the dotted line in FIG. 1 are voltage-current characteristics in a case where thermal neutrons were emitted through opening of the port, and correspond, respectively, to a voltage-current characteristic in a case where thermal neutrons were irradiated directly onto the neutron detector, and a case where thermal neutrons were blocked by interposing a metallic cadmium plate (1 mm thick), having high absorption efficiency towards thermal neutrons, between the port and the neutron detector of the present invention. The chain line in FIG. 1 denotes a voltage-current characteristic in a case where the port was closed and no neutrons were emitted.

That is, the chain line in FIG. 1 corresponds to so-called dark current and represents electric noise derived from the avalanche photodiode. The metallic cadmium plate blocks thermal neutrons, but not γ-rays. Therefore, the dotted line in FIG. 1 is a voltage-current characteristic at a time where only γ-rays that accompany thermal neutrons are irradiated onto the neutron detector, and the difference between the dotted line and the chain line represents the background noise derived from γ-rays. The solid line in FIG. 1 is the voltage-current characteristic at a time where thermal neutrons and γ-rays that accompany the latter are irradiated onto the neutron detector, and the difference between the solid line and the dotted line represents the intensity of a signal that is based on detection of thermal neutrons.

In FIG. 1, for instance the current value for a bias voltage of 350 V is 21.4 nA in the solid line and is 19.2 nA in the dotted line. Therefore, the intensity of a signal based on detection of thermal neutrons is sufficiently large, of 2.2 nA, which indicates that the neutron detector of the present invention is effective. For the chain line, the value is 18.9 nA, and the background noise derived from γ-rays is accordingly very small, of 0.3 nA. This indicates that the detector of the present invention is little affected by background noise derived from γ-rays.

Example 2

Production of a Scintillator for Neutrons

In the present example there was produced a polycrystalline sintered compact of $Li(Mn_{0.05}Mg_{0.95})BO_3$, as a scintillator for neutrons.

Herein, $Li_2CO_3$, MnO, MgO and $H_3BO_3$ were used as starting materials. The purity of the starting materials was 99.9%, 99.9%, 99.9% and 99.99%, respectively. The $^6Li$ isotope ratio of $Li_2CO_3$ and the $^{10}B$ isotope ratio of $H_3BO_3$ were 7% and 95%, respectively. Powders of the above starting materials were weighed to yield a molar ratio of $Li_2CO_3$: $MnO:MgO:H_3BO_3$=0.5:0.05:0.95:1, and were crushed and mixed in an agate mortar, followed by compression pressing, to produce pellets having a diameter of 8 mm and a thickness of 2.5 mm.

The pellets were placed on a Pt plate and were heated up to 750° C. at a temperature rise rate of 200° C./hr, followed by calcining at 750° C. for 2 hours. The obtained pellets were pulverized, and were made into pellets once more. As described above, the pellets were placed on a Pt plate and were heated up to 800° C. at a temperature rise rate of 200° C./hr. This was followed by firing for 12 hours at 800° C. Calcining and firing were performed under an Ar stream. To prevent oxidation from $Mn^{2+}$ to $Mn^{3+}$, α-Fe powder was placed upstream of the Ar stream.

The obtained sintered polycrystal had a density of 2.04 g/cm$^3$, and was found to be made up of $Li(Mn_{0.05}Mg_{0.95})BO_3$ crystals belonging to a monoclinic system, space group C2/c, on the basis of results of measurements by X-ray diffraction.

The sintered polycrystal was cut and polished, and was worked into a cylindrical plate shape of diameter 8 mm×0.5 mm, to yield the scintillator for neutrons of the present invention.

Production of a Neutron Detector and Characteristic Evaluation

A neutron detector was produced in the same way as in Example 1, but using herein the neutron scintillator comprising $Li(Mn_{0.05}Mg_{0.95})BO_3$ produced as described above, and the neutron detection characteristic of the neutron detector was evaluated.

Figure 2:
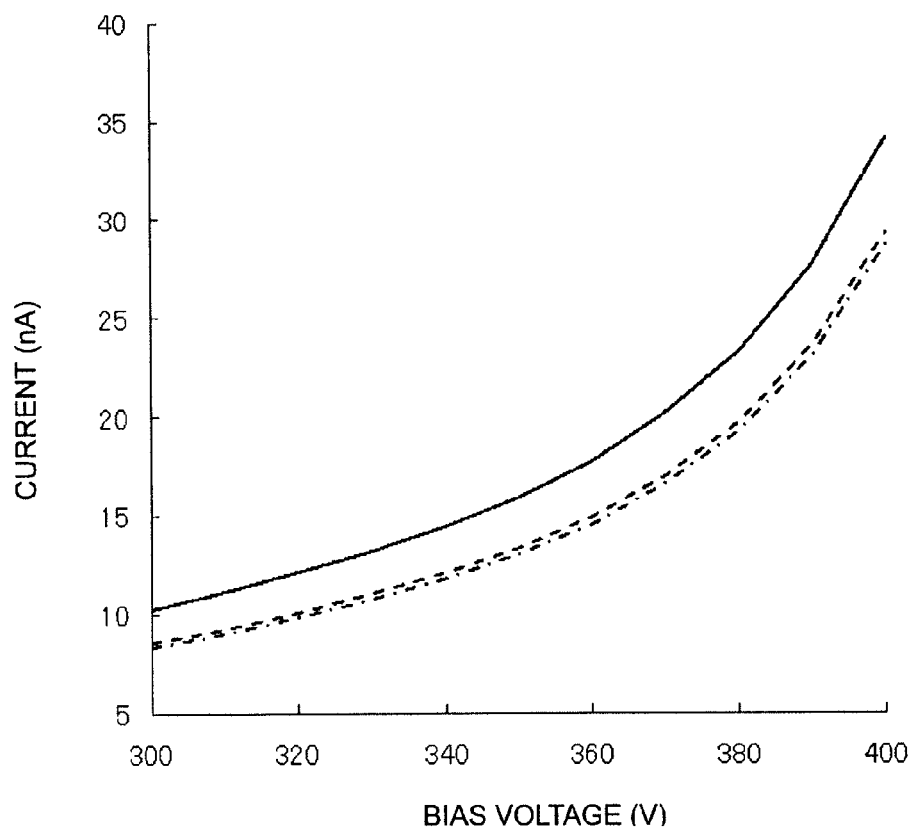
FIG. 2 is a diagram illustrating voltage-current characteristics measured using a neutron detector of Example 2.

The obtained results are illustrated in FIG. 2. The solid line, dotted line and chain line in FIG. 2 denote voltage-current characteristics under the same conditions as those in FIG. 1.

In FIG. 2, for instance the current value for a bias voltage of 350 V is 16.0 nA in the solid line and is 13.4 nA in the dotted line. Therefore, the intensity of a signal based on detection of thermal neutrons is sufficiently large, of 2.6 nA, which indicates that the neutron detector of the present invention is effective. For the chain line, the value is 13.1 nA, and the background noise derived from γ-rays is accordingly very small, of 0.3 nA. This indicates that the detector of the present invention is little affected by background noise derived from γ-rays.

The invention claimed is:

1. A scintillator for neutrons, comprising a borate that contains at least Mg and a divalent transition element, wherein a $^{10}B$ isotope ratio of boron is 50% or higher.

2. The scintillator for neutrons according to claim 1, comprising a borate represented by any of chemical formulas $(A_xMg_{1-x})B_4O_7$, $(A_xMg_{1-x})_2B_2O_5$, and $(A_xMg_{1-x})_3B_2O_6$, where A represents at least one divalent transition element selected from among Cr, Mn, Fe, Co, Ni, Cu and Zn, and x represents a numerical value ranging from 0.001 to 0.5.

3. A neutron detector, comprising the scintillator for neutrons according to claim 2 and a photodetector.

4. The scintillator for neutrons according to claim 1, comprising a borate that further comprises Li.

5. The scintillator for neutrons according to claim 4, wherein a $^6Li$ isotope ratio of Li is 50% or higher.

6. The scintillator for neutrons according to claim 5, comprising a borate represented by any of chemical formulas $Li(A_xMg_{1-x})BO_3$, $Li_2(A_xMg_{1-x})B_2O_5$ and $Li_4(A_xMg_{1-x})B_2O_6$, where A represents at least one divalent transition element selected from among Cr, Mn, Fe, Co, Ni, Cu and Zn, and x represents a numerical value ranging from 0.001 to 0.5.

7. A neutron detector, comprising the scintillator for neutrons according to claim 5 and a photodetector.

8. The scintillator for neutrons according to claim 4, comprising a borate represented by any of chemical formulas $Li(A_xMg_{1-x})BO_3$, $Li_2(A_xMg_{1-x})B_2O_5$ and $Li_4(A_xMg_{1-x})B_2O_6$, where A represents at least one divalent transition element selected from among Cr, Mn, Fe, Co, Ni, Cu and Zn, and x represents a numerical value ranging from 0.001 to 0.5.

9. A neutron detector, comprising the scintillator for neutrons according to claim 8 and a photodetector.

10. A neutron detector, comprising the scintillator for neutrons according to claim 4 and a photodetector.

11. A neutron detector, comprising the scintillator for neutrons according to claim 1 and a photodetector.

12. The neutron detector according to claim 11, wherein the photodetector is a silicon light-receiving element.

* * * * *